Patented Apr. 5, 1927.

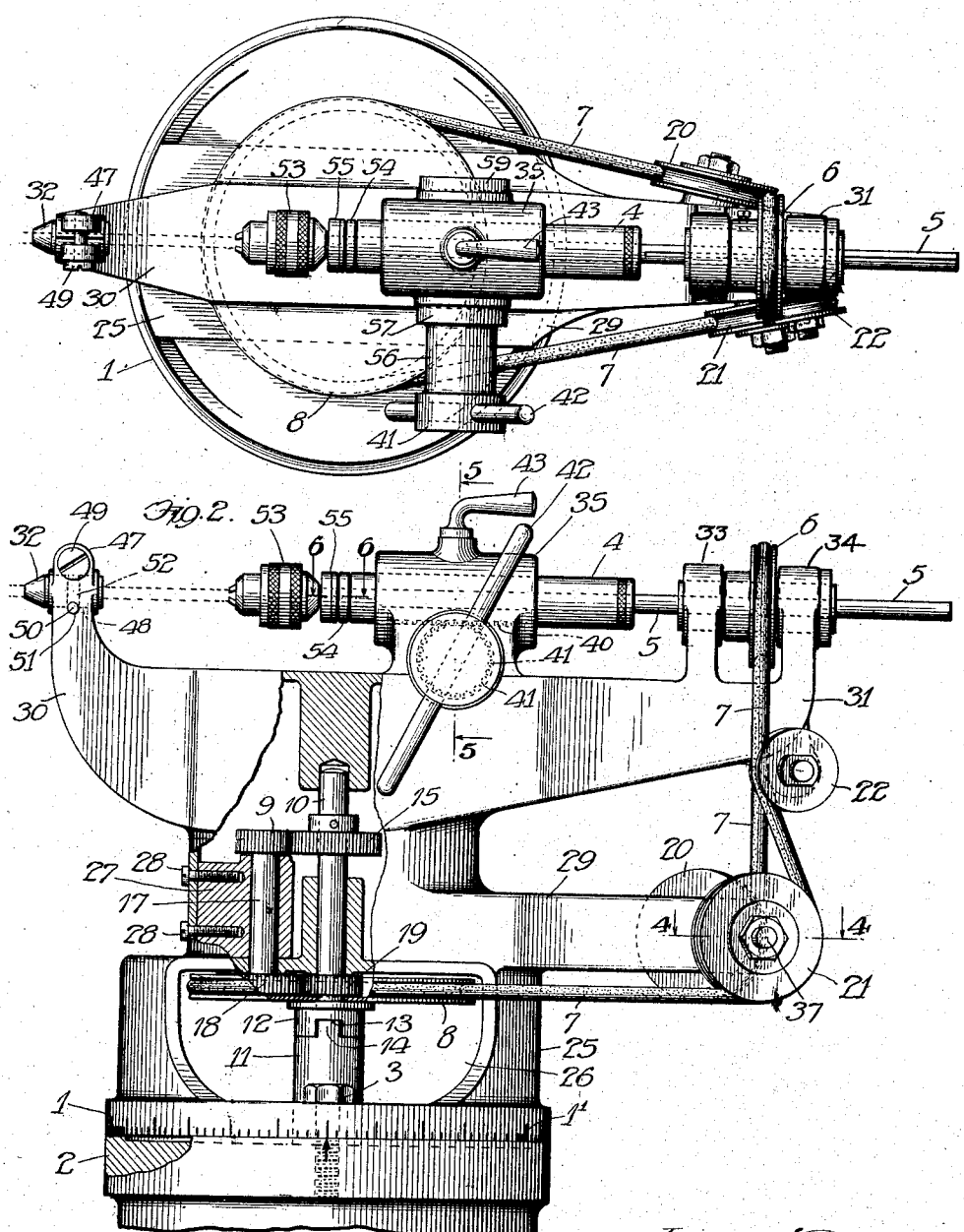

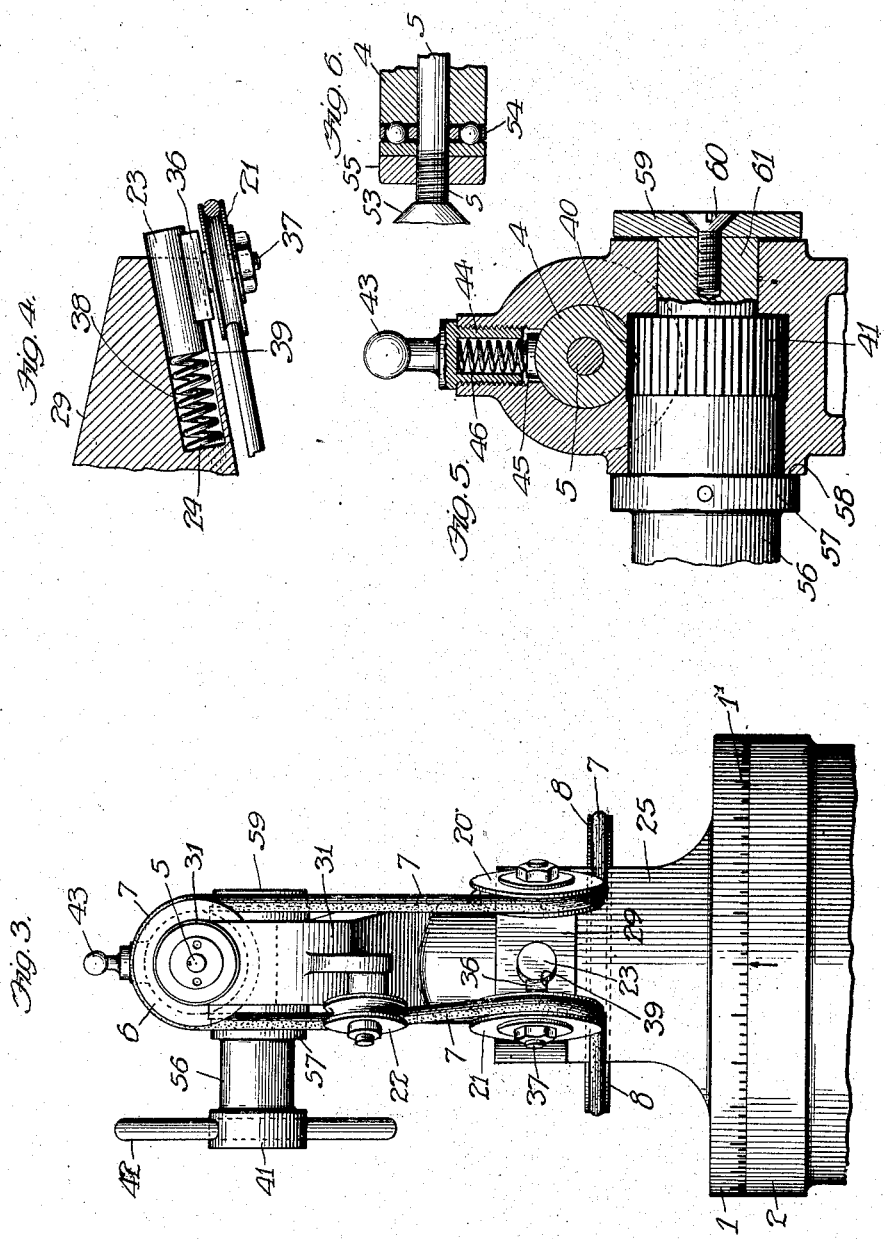

1,623,747

UNITED STATES PATENT OFFICE.

JOHN VICTOR NELSON, OF MAYWOOD, ILLINOIS, ASSIGNOR TO FRANZ K. KRAG, OF CHICAGO, ILLINOIS.

SWIVEL-HEAD DRILL HOLDER.

Application filed June 23, 1921. Serial No. 479,838.

This invention relates to drilling attachments for milling machines of the general character shown in my Patent No. 1,397,696, granted November 22, 1921.

The main objects of the invention are to provide an improved form of swivel-head and mechanism therefor; to provide a better form of power transmission means including a belt; to provide a simple and dependable automatic belt tightener therefor; to provide yielding friction means for holding the drill spindle against slipping lengthwise by gravity; to provide an improved form of interchangeable drill guide bushing and means for securing same; and to provide an improved form of antifriction thrust bearing for the drill holder.

An illustrative embodiment of this invention is shown in the accompanying drawings in which—

Fig. 1 is a front elevation of the swivel-head tilted clockwise to a horizontal position.

Fig. 2 is mainly a plan of the device positioned as in Fig. 1, part being broken away to show the speed gearing, and shows also the adjacent end of the stationary hub of the drill attachment bracket.

Fig. 3 is a plan of the swivel-head in its normal upright position and shows also part of the fixed hub.

Fig. 4 is an enlarged sectional detail of the belt tightener, on the line 4—4 of Fig. 2.

Fig. 5 is a section on the line 5—5 of Fig. 2.

Fig. 6 is an axial section of the antifriction drill bearing thrust sleeve on the line 6—6 of Fig. 2, the drill spindle being in side elevation.

In the construction shown in the drawings the swivel-head 1 is rotatably attached coaxially to the hub of the fixed bracket 2, which in turn is demountably secured to a milling machine (not shown), as explained in my said patent. The parts 1 and 2 are clamped together releasably by bolts 3 arranged parallel with the swivel axis of the device and adapted to facilitate ready adjustment of the tilt of the swivel-head. Said tilt or inclination may be measured by the gage marks 1' at the base of the head.

Mounted on the head 1 is a longitudinally movable non-rotary sleeve 4 in which is swiveled a drill spindle 5 disposed crosswise of the head 1. Said spindle is driven by a secondary pulley 6, belt 7, a primary pulley 8, speed-gear means 9, and the shaft 10. Said shaft 10 interfits endwise with a short connecting shaft 11 carried by bracket 2, the latter shaft or connector having a taper shank to fit in the driving chuck or spindle of the milling machine, as will be understood. This is more fully explained in said patent.

The swivel-head 1 is in the form of a hollow frame, the base of which contains the gearing 9 to increase the speed of said primary pulley 8. The head 12 of shaft 10 is provided with a diametral slot 13 to receive the corresponding end rib or shoulder 14 of the tapered shaft 11. The pulley 6 is splined on spindle 5.

The opposite end of shaft 10 from said head 12 is provided with a rigidly attached gear 15 which meshes with a relatively small gear 9 fixed on the shaft 17. Said shaft 17 has also a larger gear 18 meshing with a relatively small gear 19 fixed coaxially upon the hub of pulley 8, whereby a rather high speed is imparted to said pulley. The drill speed is still further increased by reason of pulley 8 being much larger than the secondary pulley 6. The pulley 8 fits rotatably against the head 12 and turns on shaft 10 as a bearing.

The drill spindle 5 being disposed at a right angle to shaft 10, the belt 7 is arranged to operate on direction changers or idle pulleys 20, 21 and 22 which are mounted on the frame in a position to receive the belt 7 in alinement with the corresponding grooves of pulleys 6 and 8. One of these idle pulleys, namely 21, serves to maintain substantially constant belt tension and for this purpose is mounted on a sliding support or carriage 23 movable toward or away from pulley 8 and shaft 10. The belt tends to draw said carriage inwardly against the expansive force of a helical compression spring 24. Said pulleys 21 and 22 receive the relatively slack side of the belt. Hence, in case of variable load the peripheral speed of both pulleys remain the same and the operation of the belt tightener does not vary the relative speeds of pulleys 6 and 8.

In order to compensate for the variable position of said pulley 21, the third idler 22, of relatively small size, is mounted between pulleys 6 and 21 and is so positioned as to assure alinement of the slack side of the belt with the groove of pulley 6.

The frame 1 includes a base part 25 having an aperture 26 on each side to give access to the connection 11—12. The middle part of said frame is provided with a journal bearing member 27 secured to the barrel-like interior of said frame for mounting the gear shaft 17 and associated members, said journal bearing member being secured by screws 28. An arm 29 projects from said frame 1 opposite member 27 in a direction parallel with the spindle 5 to support the idle pulleys 20 and 21, and the carriage 23 for the latter. The forward part of said frame 1 includes a pair of oppositely disposed arms 30 and 31 substantially parallel with spindle 5 to support the drill guide 32 and journal bearings 33 and 34 for spindle 5. Still, another arm 35 is provided on said frame to hold the sleeve 4 in alinement with said drill guide 32 and bearings 33 and 34.

The idle pulley carriage 23 is in the form of a cylindrical rod having a lateral projection or arm 36 to which is secured the pivot 37 for pulley 21. Said rod 23 fits in a cylindrical pocket 38 in the base of which is housed a spring 24, and the arm 36 slides in a longitudinal groove 39, whereby axial turning of said carriage is prevented.

The support 35 for sleeve 4 is a barrel-shaped or nearly cylindrical with a bore adapted to receive the sleeve 4 in snug fitting relation. The inner side of sleeve 4 is provided with a rack 40, the teeth of which coact with the hand-controlled thrust gear 41 having a handle 42. Said sleeve and gear are so formed, as shown by Fig. 5, that axial turning of said sleeve is prevented.

In order to provide for manual setting of sleeve 4 or adjustment of the operation thereof, a handle 43 is provided having a threaded shank 44 screwed into the member 35, which shank is hollow and provided with a yielding member 45 urged by spring 46 against and into frictional engagement with sleeve 4. Said spring is helical in shape and arranged to operate by compression, the tension being increased or diminished by turning the handle correspondingly clockwise or the reverse.

The outer tip of arm 30 is provided with a split ring 47 having a cylindrical bore 48 to receive the interchangeable drill guide 32. In order that said guide may be readily secured or released, a clamping screw 49 is provided to pull the ends together where the ring is split, as will be understood. In order to positively lock the cylindrical guide 32 in place, a spring actuated pin 50 is mounted in a perforation 51 disposed crosswise of the guide 32 on the inner side of the latter and in a position to tangentially engage a peripheral groove 52 on said guide. Said pin 50 is of somewhat larger diameter at one end than at the other so that when partly retracted the relatively small end does not engage said groove 52, but leaves the guide 32 free for extraction. When, however, the pin 50 is released it is forced forward by its actuating spring so that the thick part enters groove 52 and so locks the guide 32 in place. The tip of pin 50 normally projects somewhat so as to be accessible for forcing inward readily by manual means to release the guide member 32.

In order to eliminate friction to the highest degree possible, the thrust sleeve 4 is provided with annular anti-friction bearing means adjacent to the drill head 53, said bearings including a plurality of balls 54 coacting between the non-rotary sleeve 4 and rotary shoulder member 55 on the forward end of spindle 5.

The operation of the above described attachment is as follows: The fixed bracket 2 having been attached to an appropriate machine as will be understood, and properly connected to receive power, a drill is placed in the head 53 and a corresponding guide member 32 is placed in the arm 30. The swivel-head 1 is then adjusted by loosening screws 3, tilting to the required degree as measured by gage marks 1', and again setting the screws 3. The power being turned on, the drill is applied to the work by turning the handle 42 counter-clockwise, thereby advancing the sleeve 4. The larger the drill or the more pressure is applied through handle 42, the more a tendency will develop for the belt to slip, which however is compensated for by the outward movement of the idler pulley 21 on its carriage 23 so that premature belt slippage is avoided. In case the size of drill is to be changed, the screw 49 is released and pressure is applied to the pin 50 sufficiently to release the cap 32, which may then be withdrawn and the desired size of guide inserted in its place, whereupon the pin 50 is released and the screw 49 set to clamp the guide tightly in place.

Although but one specific embodiment of this invention has been herein shown and described, it will be understood that numerous details of the construction shown may be altered or omitted without departing from the spirit of this invention as defined by the following claims.

I claim:

1. A drilling attachment comprising a head adapted to be tiltably mounted on a part of a machine frame having a drive shaft, a driven shaft journalled in said head in alignment with the drive shaft and operatively connected thereto, a pulley on said driven shaft journalled in said head which head includes a plurality of spaced arms with aligned bearing openings therein, arranged in a plane at a right angle to said drive and driven shafts, a feed sleeve mounted in one of said arms, a drill spindle journalled in said sleeve and in one of said other arms, a pulley on said drill spindle for driving the same, a belt operatively connecting said pulleys together, two idle pulleys journalled on said head and about which said belt is trained for changing the direction thereof, a movable spring pressed block slidably mounted in said head and upon which one of said idle pulleys is mounted for imposing a tension on said belt, and a third pulley journalled in the head for engaging the belt between said pulley on the spindle shaft and said pulley on the block for holding straight that portion of the belt leading to the spindle pulley irrespective of the location of the pulley on said spring pressed block.

2. A drilling attachment comprising a head adapted to be tiltably mounted on a part of a machine frame having a drive shaft, a driven shaft journalled in said head in alignment with the drive shaft and operatively connected thereto, a pulley loosely mounted on said driven shaft, speed increasing gearing between said driven shaft and pulley, a plurality of arm extensions on said head, having aligned bearing openings therein, arranged in a plane at right angles to said drive and driven shafts, a feed sleeve mounted in one of said arms, a drill spindle journalled in said sleeve and in one of said other arms, a pulley on said drill spindle for driving the same, a belt operatively connecting said pulleys together, two idle pulleys journalled on said head about which said belt is trained for changing the direction thereof, and a movable spring pressed block slidably mounted in said head and upon which one of said idle pulleys is mounted for imposing a tension on said belt, and a third idle pulley journalled on the head for engaging the belt between said pulley on the spindle shaft and said idle pulley mounted on said block for holding straight that portion of the belt leading to the spindle pulley irrespective of the location of the idle pulley on said spring pressed block.

Signed at Chicago this 20th day of June, 1921.

JOHN VICTOR NELSON.